United States Patent
Lomayev et al.

(10) Patent No.: US 10,355,896 B2
(45) Date of Patent: Jul. 16, 2019

(54) OPTIMIZED CHANNEL ESTIMATION FIELD FOR ENHANCED DIRECTIONAL MULTI-GIGABIT NETWORK

(71) Applicant: Intel Corporation, Santa Clara, CA (US)

(72) Inventors: Artyom Lomayev, Nizhny Novgorod (RU); Iaroslav P. Gagiev, Nizhny Novgorod (RU); Alexander Maltsev, Nizhny Novgorod (RU); Michael Genossar, Modiin (IL); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 15/393,520

(22) Filed: Dec. 29, 2016

(65) Prior Publication Data

US 2018/0076979 A1 Mar. 15, 2018

Related U.S. Application Data

(60) Provisional application No. 62/385,717, filed on Sep. 9, 2016.

(51) Int. Cl.
*H04L 27/26* (2006.01)
*H04L 25/02* (2006.01)
*H04L 5/00* (2006.01)

(52) U.S. Cl.
CPC ...... *H04L 27/2601* (2013.01); *H04L 25/0226* (2013.01); *H04L 5/0023* (2013.01); *H04L 5/0048* (2013.01); *H04L 27/2611* (2013.01)

(58) Field of Classification Search
CPC ............ H04L 25/0202; H04L 27/2601; H04L 25/0226; H04L 5/0023; H04L 5/0048; H04W 72/0446
See application file for complete search history.

(56) References Cited

U.S. PATENT DOCUMENTS

| 2016/0309457 | A1* | 10/2016 | Eitan | .............. H04L 1/0079 |
| 2017/0033958 | A1* | 2/2017 | Eitan | .............. H04L 25/0202 |
| 2017/0257201 | A1* | 9/2017 | Eitan | .............. H04B 7/0413 |
| 2017/0373808 | A1* | 12/2017 | Park | .............. H04L 5/005 |

* cited by examiner

*Primary Examiner* — Habte Mered
(74) *Attorney, Agent, or Firm* — Eversheds Sutherland (US) LLP

(57) ABSTRACT

This disclosure describes systems, methods, and devices related to an optimized channel estimation field. A device may determine an enhanced directional multi-gigabit (EDMG) frame to be sent to a first device using a communication link. The device may determine a channel estimation field (CEF) associated with the EDMG frame, wherein the CEF is comprised of one or more orthogonal frequency division multiplexing (OFDM) symbols. The device may cause to send the EDMG frame to the first device.

19 Claims, 8 Drawing Sheets

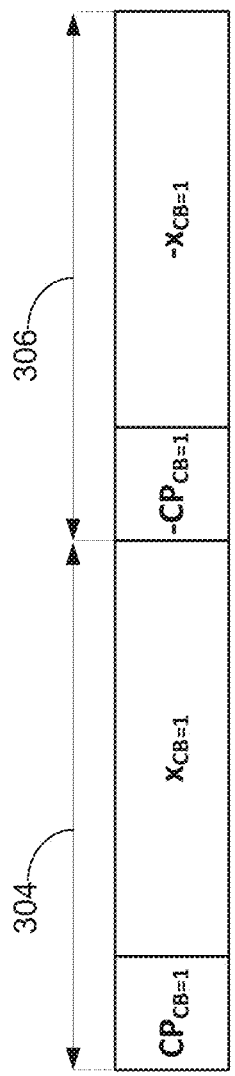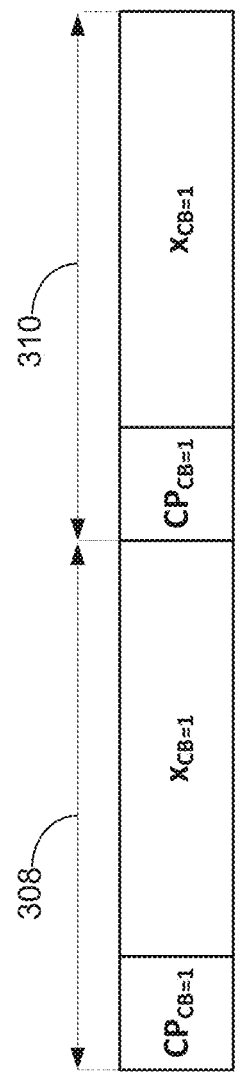

OPTIMIZED CHANNEL ESTIMATION FIELD FOR ENHANCED DIRECTIONAL MULTI-GIGABIT NETWORK

CROSS-REFERENCE TO RELATED APPLICATIONS

This application claims the benefit of U.S. Provisional Application No. 62/385,717 filed on Sep. 9, 2016, the disclosure of which is incorporated herein by reference as if set forth in full.

TECHNICAL FIELD

This disclosure generally relates to systems and methods for wireless communications and, more particularly, to an optimized channel estimation field.

BACKGROUND

Wireless devices are becoming widely prevalent and are increasingly requesting access to wireless channels. The growing density of wireless deployments requires increased network and spectrum availability. Wireless devices may communicate with each other using directional transmission techniques, including but not limited to beamforming techniques. Wireless devices may communicate over a next generation 60 GHz (NG60) network, an enhanced directional multi-gigabit (EDMG) network, and/or any other network.

BRIEF DESCRIPTION OF THE DRAWINGS

FIGS. 3A-3B depict illustrative schematic diagrams associated with an optimized channel estimation field system, in accordance with one or more example embodiments of the present disclosure.

DETAILED DESCRIPTION

Figure 1:
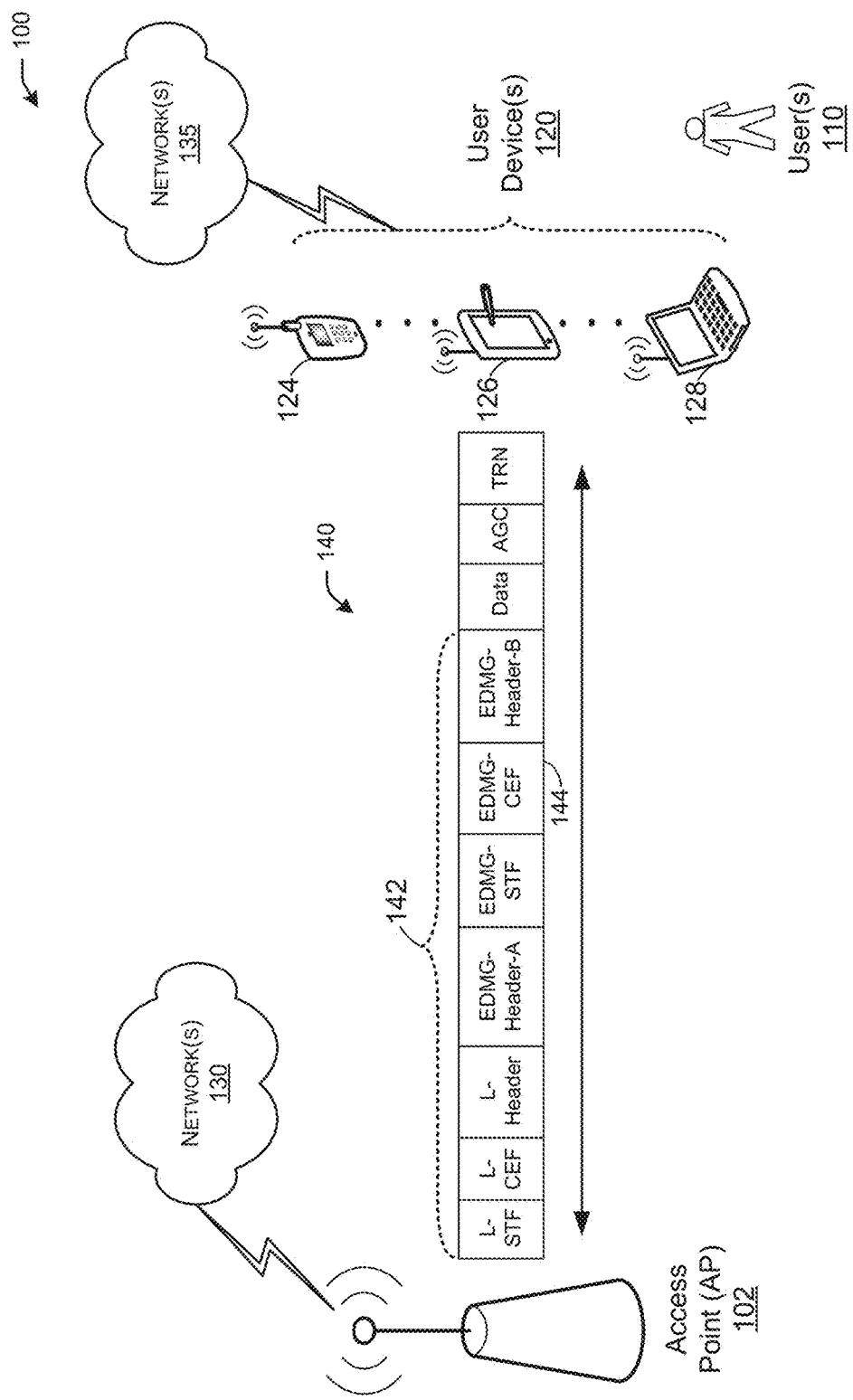
FIG. 1 depicts a network diagram illustrating an example network environment for an optimized channel estimation field system, in accordance with one or more example embodiments of the present disclosure.

Example embodiments described herein provide certain systems, methods, and devices for an optimized channel estimation field. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Devices may communicate over a next generation 60 GHz (NG60) network, an enhanced directional multi-gigabit (EDMG) network, and/or any other network. Devices operating in EDMG may be referred to herein as EDMG devices. This may include user devices, and/or access points (APs) or other devices capable of communicating in accordance with a communication standard, including but not limited to IEEE 802.11ad and/or IEEE 802.11ay.

A typical enhanced directional multi-gigabit (EDMG) A physical layer convergence protocol (PLCP) data unit (PPDU) frame format may be composed of a legacy preamble, a legacy header, an EDMG-Header-A containing single user multiple-input multiple-output (SU-MIMO) parameters, an EDMG short training field (EDMG-STF), an EDMG channel estimation field (EDMG-CEF), an EDMG-Header-B containing multi-user multiple-input multiple-output (MU-MIMO) parameters, a payload data part and optional automatic gain control (AGC) and beamforming training units appended at the end of the frame. The legacy preamble, the legacy header, and a new EDMG-Header-A may be transmitted using single-input single-output (SISO) single carrier (SC) physical layer (PHY) modulation. This provides an opportunity for the legacy directional multi-gigabit (DMG) devices to decode legacy headers and identify (using a signaling bit) that the frame contains the EDMG part not compatible with its implementation. This realizes a backward compatibility requirement. At the same time, EDMG devices can decode the EDMG-Header-A using SISO SC PHY modulation and extract the required parameters for MIMO frame reception. The transmission of the rest of the EDMG frame may be done using MIMO modulation.

A channel estimation technique plays an important role in communication systems. Having an accurate channel response is very important for equalization, demodulation, and decoding. Therefore, the accuracy of the channel estimation is correlated with system performance. Since in wireless systems radio propagations may be influenced by noise, interferences, location, movements, etc., it may be difficult to detect the variation of channels. Hence, efficiently estimating the wireless channels is an important aspect for reliable communication systems. In order to remedy these issues, pilots or reference signals that do not interfere with one another can be used to provide reliable channel estimation.

Example embodiments of the present disclosure relate to systems, methods, and devices for an optimized channel estimation field.

Directional multi-gigabit (DMG) communications may involve one or more directional links to communicate at a rate of multiple gigabits per second, for example, at least 1 gigabit per second, 7 gigabits per second, or any other rate. An amendment to a DMG operation in a 60 GHz band, e.g., according to an IEEE 802.11ad standard, may be defined, for example, by an IEEE 802.11 ay project.

In some demonstrative embodiments, one or more devices may be configured to communicate over a next generation 60 GHz (NG60) network, an enhanced DMG (EDMG)

network, and/or any other network. For example, the one or more devices may be configured to communicate over the NG60 or EDMG networks.

In one embodiment, an optimized channel estimation field system may facilitate a design of CEF for EDMG orthogonal frequency division multiplexing (OFDM) for the physical layer (PHY). The optimized channel estimation field system may cover single-input single-output (SISO) and MIMO single channel transmission.

In one embodiment, an optimized channel estimation field system may determine an EDMG CEF to be comprised of two OFDM symbols. In one option, the second symbol may be defined as a copy of the first symbol with a difference in that it is defined in an inverse sign. In another option, the second OFDM symbol may represent an exact copy of the first OFDM symbol.

In one embodiment, an optimized channel estimation field system may define pilot sequences in the frequency domain, rather than time domain Golay sequences defined in the IEEE 802.11ad standard.

In one embodiment, an optimized channel estimation field system may facilitate a mutually orthogonal sequence set, instead of using cyclic shift diversity (CSD) as done in legacy devices (e.g., IEEE 802.11n/ac). The orthogonality property of the sequences prevents the coherent signal transmission of different space-time streams in case of MIMO and avoids unintentional beamforming.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment, in accordance with one or more example embodiments of the present disclosure. Wireless network 100 may include one or more user device(s) 120 and one or more access point(s) (AP) 102, which may communicate in accordance with IEEE 802.11 communication standards, such as the IEEE 802.11ad and/or IEEE 802.11ay specifications. The user device(s) 120 may be referred to as stations (STAs). The user device(s) 120 may be mobile devices that are non-stationary and do not have fixed locations. Although the AP 102 is shown to be communicating on multiple antennas with user devices 120, it should be understood that this is only for illustrative purposes and that any user device 120 may also communicate using multiple antennas with other user devices 120 and/or AP 102.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices such as lamps, climate control, car components, household components, appliances, etc. may also be included in this list.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some demonstrative embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

The phrases "directional multi-gigabit (DMG)" and "directional band (DBand)", as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

In some demonstrative embodiments, the user device(s) 120 and/or the AP 102 may be configured to operate in accordance with one or more specifications, including one or more IEEE 802.11 specifications, (e.g., an IEEE 802.11ad specification, an IEEE 802.11ay specification, and/or any other specification and/or protocol).

In one embodiment, and with reference to FIG. 1, there is shown a general frame format for the EDMG PPDU 140. The preamble 142 of the EDMG PPDU 140 includes, at least in part, a legacy short training field (STF), a legacy channel estimation field (CEF), a legacy header (L-Header), a new EDMG-Header-A, an EDMG-STF, an EDMG-CEF 144, and an EDMG-Header-B. Beside the preamble 142, the EDMG PPDU 140 may include a data part and optional AGC and beamforming training units (TRNs). It is understood that the above acronyms may be different and are not to be construed as a limitation because other acronyms may be used for the fields included in an EDMG PPDU 140.

The EDMG-CEF 144 may be used for channel estimation and for differentiation between the spatial streams and between the SC PHY and the OFDM PHY.

In one embodiment, an optimized channel estimation system may define a structure for channel estimation for SISO and for MIMO. For SISO, the EDMG-CEF 144 may be composed of two OFDM symbols. For MIMO, the general structure of the EDMG-CEF 144 may be composed of two OFDM symbols having a set of sequences such that different streams have different sequences, and the sequence definition is not obtained by cyclic shift diversity. It is understood that the above descriptions are for purposes of illustration and are not meant to be limiting.

Figure 2A:
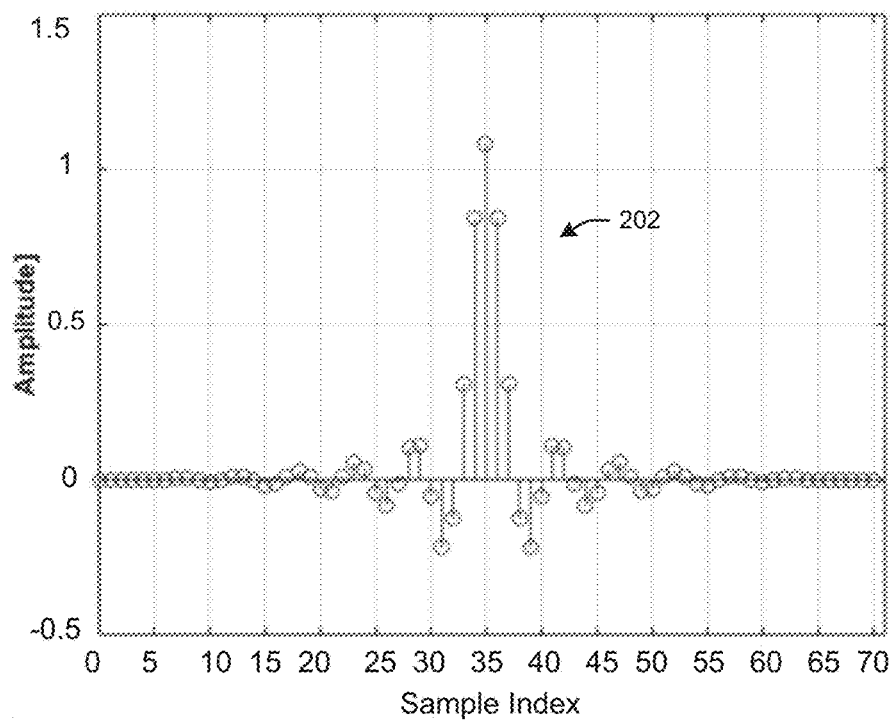
FIGS. 2A-2B depict illustrative schematic diagrams for a time domain impulse response and a frequency domain impulse response, in accordance with one or more example embodiments of the present disclosure.
Figure 2B:
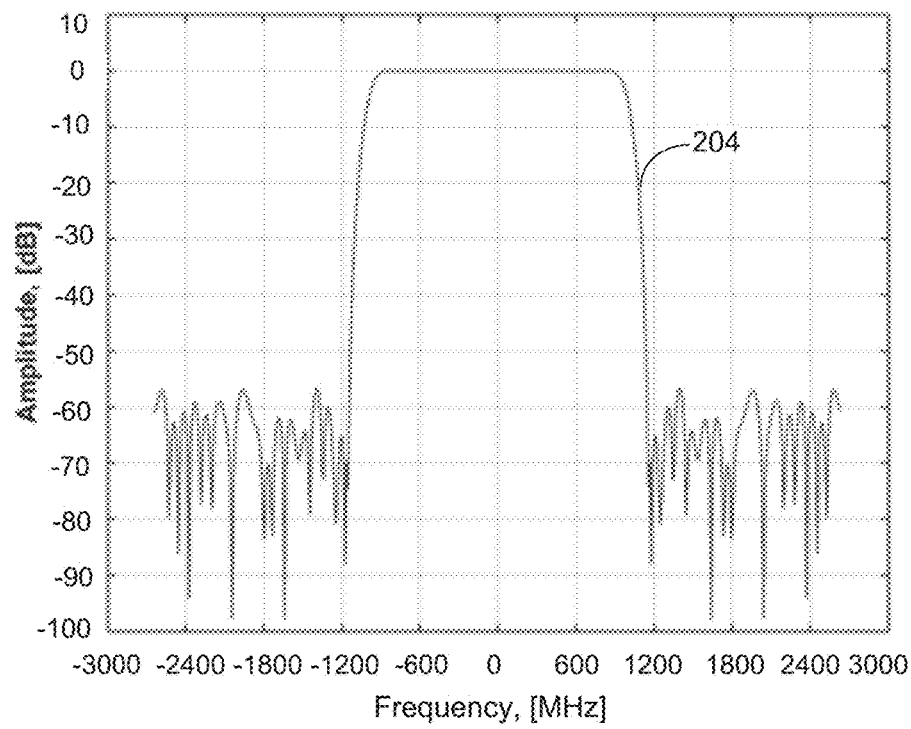

FIGS. 2A-2B depict illustrative schematic diagrams for a time domain impulse response and a frequency domain impulse response, in accordance with one or more example embodiments of the present disclosure.

Referring to FIG. 2A and FIG. 2B, the legacy DMG-CEF field for the OFDM PHY is defined in a time domain and is based on the Golay sequences similar to the single carrier (SC) PHY. The original Golay sequences are convolved with a shaping filter with about 1.5× rate conversions. The pulse shaping filter impulse response is defined, for example, in the IEEE 802.11ad standard. The pulse shaping filter impulse response may have almost flat frequency response for in-band subcarriers corresponding to the data and pilots (e.g., as seen in graphs 202 and 204). The maximum frequency response amplitude deviation for the data subcarriers may be equal to ~0.8 dB. This may allow channel estimation for in-band subcarriers directly in the frequency domain.

FIGS. 3A-3B depict illustrative schematic diagrams associated with an optimized channel estimation field system, in accordance with one or more example embodiments of the present disclosure.

In one embodiment, an optimized channel estimation system may define a structure for channel estimation for SISO and for MIMO. For SISO, the channel estimation may be composed of two OFDM symbols.

The spectrum definition of an OFDM signal is composed of 512 subcarriers, where the three middle subcarriers are used by the zero DC subcarriers. There are 176 subcarriers on the right and 176 subcarriers on the left of the DC subcarriers that are for data transmission and 79 zeros on the left and 78 zeros on the right.

In order to define the EDMG channel estimation field for SISO transmission, two symbols following each other may be defined. The first symbol may be defined to have three DC subcarriers in the middle, which are used to minimize the leakage of the DC subcarriers to the data subcarriers. Further, zero subcarriers (e.g., 79 zero subcarriers) may be added on the left side of the 176 data subcarriers located on the left of the DC subcarriers, and zero subcarriers (e.g., 78 zero subcarriers) may be added on the right side of the 176 data subcarriers located on the right side of the DC subcarriers in order to meet the spectrum mask requirement. The second symbol is defined as a replica of the first one with a difference in that it is defined in an inverse sign. When these two symbols are transformed to the time domain, 512 samples in the time domain may be obtained. A cyclic prefix may be added in front of each of these two symbols.

Referring to FIG. 3A, there is shown a SISO EDMG-CEF structure for the OFDM PHY in the time domain. The SISO EDMG-CEF field may be comprised of two CEF symbols (e.g., symbol 304 and symbol 306). These two CEF symbols are OFDM symbols. The symbols may follow each other in the time domain.

In one embodiment, an optimized channel estimation field system may determine the composition of the two CEF symbols (e.g., symbol 304 and symbol 306) in the frequency domain. In one option, the symbol 306 may have inverted sign polarity of the symbol 304. In another option, the second OFDM symbol may represent an exact copy of the first OFDM symbol.

In one embodiment, in a first option, and in contrast to the IEEE 802.11ad standard, the pilot sequence is defined in the frequency domain and for the single channel transmission, the sequence may have the following structure:

Symbol 304: $\{0_{1:79}, SigA_{1:176}, 0, 0, 0, SigB_{1:176}, 0_{1:78}\}$; and

Symbol 306: $\{0_{1:79}, -SigA_{1:176}, 0, 0, 0, -SigB_{1:176}, 0_{1:78}\}$;

Where SigA and SigB may occupy 336 data and 16 pilot subcarriers; 3 DC and 78+79 guard band subcarriers are zero ones.

SigA and SigB may be sequences that provide a low peak to average power ratio (PAPR) after application of the inverse discrete Fourier transform (IDFT) transformation in the time domain. It should be understood that the symbol structure above is defined before a DFT shift operation. After the DFT shift operation is applied, the symbols may be transformed to be:

$X_{CB=1} = \{0, 0, SigB_{1:176}, 0_{1:78}, 0_{1:79}, SigA_{1:176}, 0\}$. The EDMG-CEF field represented in the time domain may be defined as follows:

$x_{CB=1} = IDFT(X_{CB=1})$; where $x_{CB=1}$ is in the time domain and $X_{CB=1}$ is the frequency domain.

Symbol 304 may be composed of the structure: $\{CP_{CB=1}, x_{CB=1}\}$, and the symbol 306 may be composed of the structure: $\{-CP_{CB=1}, -x_{CB=1}\}$, and $CP_{CB=1} = X_{CB=1}(\text{end}-N_{CP}: \text{end})$ as shown in FIG. 3A, where CP defines the cyclic prefix and $N_cp$ defines the length of the CP.

The total duration may be equal to 1280 samples @ 2.64 GHz as compared to the legacy IEEE 802.11ad, which has a length equal to 1728 samples @ 2.64 GHz, resulting in a 1.35 times shorter duration.

In one embodiment, and in a second option, the second OFDM symbol is an exact copy of the first OFDM symbol. FIG. 3B shows the SISO EDMG-CEF structure for the OFDM PHY in the time domain in a second option, where the second OFDM symbol (e.g., symbol 310) represents an exact copy of the first OFDM symbol (e.g., symbol 308). It is understood that the above descriptions are for purposes of illustration and are not meant to be limiting.

Figure 4A:
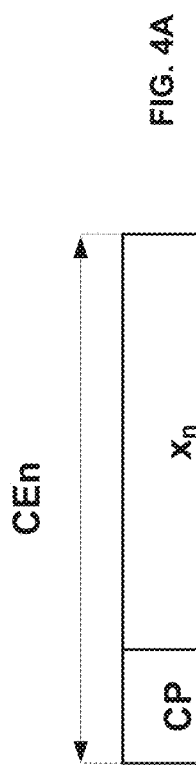
FIGS. 4A-4B depict illustrative schematic diagrams associated with an optimized channel estimation field system, in accordance with one or more example embodiments of the present disclosure.
Figure 4B:
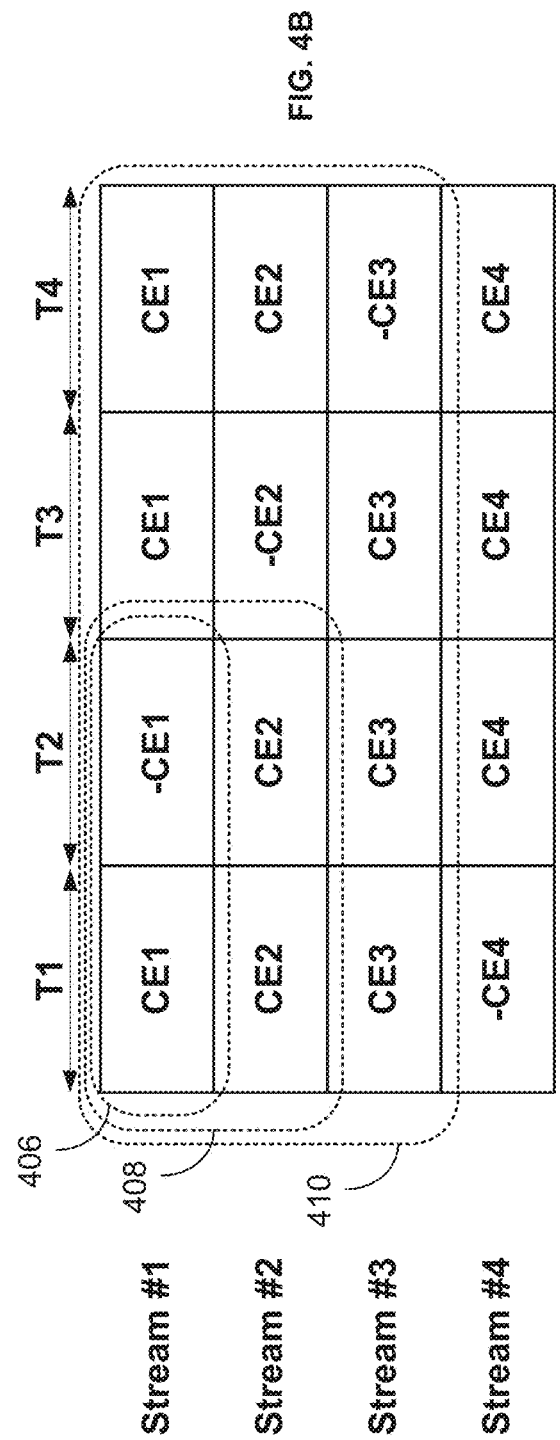

FIGS. 4A-4B depict illustrative schematic diagrams for an optimized channel estimation field system, in accordance with one or more example embodiments of the present disclosure.

Referring to FIG. 4A, there is shown a structure of a channel estimation symbol having a first part and a second part. This first part may be a cyclic prefix (CP), and the second part may be a sequence definition associated with each stream. For example, a channel estimation symbol (e.g., $CE_n$), is associated with the $n^{th}$ stream. It should be understood that the reference to stream is a reference to a space-time stream that may carry information between a transmitting device and a receiving device based on antenna beamforming.

Referring to FIG. 4B, examples of an EDMG-CEF and P matrix for four space-time streams ($N_{STS}=4$) are shown. Each entity in FIG. 4B represents a single OFDM symbol defined using the $n^{th}$ sequence of the set. The P matrix can be defined as an arbitrary orthogonal matrix. It should be understood that although only four streams are shown, the mechanisms described may also be applicable to a larger number of streams.

In one embodiment, the optimized channel estimation field system may facilitate generation of an MIMO EDMG-CEF field for OFDM on the transmitting device. When the receiving device receives the symbols associated with the EDMG-CEF fields received from the transmitting device, the receiving device may be able to determine the channel estimation symbols (e.g., CE1, CE2, CE3, and CE4) based on how the structure was generated on the transmitting device. For MIMO, the structure may be generalized for any number of streams by selecting the size of the structure in accordance with an orthogonal P matrix to cover as many streams as possible. It should be understood that IEEE 802.11ad does not have MIMO support, and the sequence is defined in the time domain.

In one embodiment, an optimized channel estimation system may use mutually orthogonal sequences for the channel estimation fields associated with the various streams. In IEEE 802.11 n/ac, a single sequence is used, where cyclic shift diversity is applied to prevent coherent transmissions between different streams. In other words, IEEE 802.11 n/ac use only one sequence of pilots in the frequency domain and then that sequence is transferred to the time domain using IDFT. Consequently, in order to get different signals in the time domain for different streams, cyclic shift diversity is applied in the time domain.

In one embodiment, an optimized channel estimation system, on the transmitting device, and a set of sequences of pilots in the frequency domain may be defined such that the sequences in the set are different from each other within the frequency domain even before transferring the sequences to the time domain using IDFT. Consequently, when these sequences are transferred to the time domain using IDFT, different time domain sequences are generated without the need to utilize cyclic shift diversity to differentiate the different streams. This is because the sequences were different in the frequency domain even before applying the IDFT.

As shown in FIG. 4B, if only one stream is used between the transmitting device and the receiving device, the symbols received during timeslots T1 and T2 (e.g., symbols 406) may be enough for the receiving device to determine the channel estimation associated with that stream. This is similar to the SISO scenario described in FIGS. 3A and 3B.

In the symbols 406, there is shown the scenario where the second symbol (e.g., the symbol during T2) is the inverse of the first symbol (e.g., the symbol during T1). The receiving device may be able to determine, based on these two received symbols what the channel estimation is.

In another example where two streams are established between the transmitting device and the receiving device, the channel estimation symbols (e.g., symbols 408) received during timeslots T1 and T2, where T2 is subsequent to T1 in the time domain may be needed in order to determine the channel estimation for stream one and stream two. For example, having two streams, the receiving device may receive CE1+CE2 during T1. During T2, the receiving device may receive −CE1+CE2 as shown in FIG. 4B. In order to extract CE2, the received sum (e.g., CE1+CE2) during T1 is added to the received difference (e.g., −CE1+CE2) during T2. That is, [CE1+CE2]−[−CE1+CE2]=2CE2. Therefore, the channel estimation of the second stream is determined, and the receiving device is able to utilize the channel estimation for the second stream when receiving other frames on that stream. In a similar manner, in order to extract CE1, the received sum during T1 is subtracted from the received sum during T2. That is, [CE1+CE2]−[−CE1+CE2]=2CE1. Therefore, the channel estimation of the first stream is determined, and the receiving device is able to utilize the channel estimation for the first stream when receiving other frames on that stream. A similar mechanism may be applied based on the number of streams needed. This mechanism will ensure that the receiver is able to separate the streams.

In one embodiment, in order to extract the channel estimations for three streams, the receiving device may wait until it receives all the combined channel estimations during timeslots T1, T2, T3, and T4. In that case, the structure shown in FIG. 4B is used, where an inverted channel estimation symbol is sent by the transmitting device at certain timeslots in order for the receiving device to be able to perform subtraction or addition to determine the channel estimation of each strain. For example, the receiving device may perform addition and subtraction operations between symbols 410 received in timeslots T1, T2, T3, and T4 in order to extract CE1, CE2 and CE3.

In one embodiment, the optimized channel estimation system may facilitate the generation of an EDMG-CEF field in MIMO based on a P orthogonal sign matrix. In this case, the optimized channel estimation system may determine different sequences for different streams. Consequently, sequences $\{x_n\}$, where $n=1:N_{STS}$ may be determined on the transmitting device, which are based on the frequency domain and not cyclic shift diversity as was done in the IEEE 802.11ac standard. It should be noted that $N_{STS}$ is associated with a number of space-time streams.

In one embodiment, an optimized channel estimation system may construct a sequence set. Different streams have different sequences. For example, CE1 is composed of one OFDM symbol. The OFDM symbol is defined in the frequency domain as was described previously, where a sequence is defined using sequence A and sequence B on the left and the right side of the DC subcarriers. That is, CE1 uses a first sequence (having its own sequences A and B), and CE2 uses a second sequence (having its own sequences A and B), and so on. Therefore, each stream uses its own sequence, where the sequences are defined in the frequency domain, and the index n defines the stream number.

In order to define each sequence of a channel estimation symbol (e.g., CE1), sequence A and sequence B may be determined, where sequence A is for the left side of the spectrum, and sequence B is for the right side of the spectrum. Sequence A and sequence B may be defined using a modulation alphabet, which consists of four different signaling alternatives and may be illustrated as having four different points in a two-dimensional plane. This provides for a simple channel estimation. That is, when the receiving device receives the symbols, it multiplies the pilots by the channel. In order to extract the channel coefficients, a division by the pilot value may be performed. Therefore, if the pilot value is +1 or −1, +j or −j, there is no need for the division implementation.

In one embodiment, an optimized channel estimation system may generate the sequence set design by applying the following mechanism:

A frequency domain pilot sequence $\{SeqA_n, SeqB_n\}$ for the $n^{th}$ space-time stream, $n=1:N_{STS}$, is defined using the $\{\pm 1, \pm j\}$ alphabet. This may allow simple channel estimation by avoiding implementation of the division operation explained above. The Peak to Average Power Ratio (PAPR) for each sequence $\{SeqA_n, SeqB_n\}$ in the set should be less or equal to 3.0 dB. A low PAPR value may allow channel estimation in the "linear" power amplifier regime and may minimize the non-linear distortion of the resulting channel estimation. All frequency domain pilot sequences $\{SeqA_n, SeqB_n\}$, $n=1:N_{STS}$, are mutually orthogonal. This may avoid unintentional beamforming.

In one embodiment, the sequence set $\{SeqA_n, SeqB_n\}$, $n=1:N_{STS}$ for MIMO is constructed applying the iterative procedure described below:

The iteration process starts from the basic sequences $A^{(0)}$ and $B^{(0)}$ defined using the $\{\pm 1, \pm j\}$ alphabet:

$A^{(0)}=\{+1, +j, +j, -1, -j, +j, -1, +1, -1, +j, +1\}$, having a length of 11.

$B^{(0)}=\{-1, +1, -1, +j, +1, +1, -j, -j, -j, +1, +1\}$, having a length of 11.

The iterative procedure for the $n^{th}$ sequence is defined as follows:

$A_n^{(k)}=\{W(n, k)*A_n^{(k-1)}, B_n^{(k-1)}\}$;

$B_n^{(k)}=\{W(n, k)*A_n^{(k-1)}, -B_n^{(k-1)}\}$; where "k" defines the iteration index.

To achieve the sequence length for A and B of 176 symbols, one needs to make 4 iterations, k=1, 2, 3, 4, which will give 176=16*11.

Performing the first iteration may be determined using the previous iteration of sequence A multiplied by a weight vector W and merged by the sequence B at the end. For the B sequence, it has the same first part as the sequence A, however, it is merged with an inverse of sequence B at the end. Performing four iterations will result in the required length of sequence A and sequence B.

Different weight vectors W may be defined to generate different sequences. Using a different weight Vector W results in generating a different sequence A and sequence B. Consequently, each stream would result in having different sequences A and B and therefore different channel estimation. The column defines the iteration, and the row defines the stream number. Four iterations may be needed to get the required length of 176. The choices of the weight vector W allows that the PAPR meets the required thresholds (<=3 dB). This also allows for orthogonality between different streams; that is, orthogonality between the pairs of sequences A and B of one stream and another pairs of sequences A and B of another stream. After IDFT is applied to each pair, orthogonality between the time domain sequences may be preserved, because DFT is a unitary transformation. Although a length of 11 for sequence $A^{(0)}$ and $B^{(0)}$ was used, a length of 176 for sequence A and sequence B is needed in order to complete the spectrum definition of an OFDM signal, which is composed of 352 occupied (336 data+16 pilots) and 160 zero subcarriers, so in total 512 subcarriers.

The sequences SeqA$_n$ and SeqB$_n$ are defined as follows: SeqA$_n$=A$_n^{(4)}$; SeqB$_n$=B$_n^{(4)}$;

The weight matrix W is defined as follows:

$$W = \{+1, -1, +j, -j;$$
$$-j, +1, -j, -j;$$
$$+1, -j, +1, -j;$$
$$-1, +1, -1, -j;$$
$$+1, +j, -1, -j;$$
$$-1, +j, +1, -j;$$
$$+j, -j, -j, -j;$$
$$1, +1, +j, -j;$$
$$-1, -1, -j, -j;$$
$$-j, -j, -j, -j;$$
$$+j, +1, +j, -j;$$
$$-j, +1, +1, -j;$$
$$-1, +j, -j, -j;$$
$$+j, -j, +1, -j;$$
$$-j, +1, -1, -j;$$
$$-j, -1, -j, -j\}.$$

A row vector in matrix W defines the weight vector for a given sequence with index "n." A column vector in matrix W defines the weights over all sequences in the set for the given iteration with index "k." Therefore, this procedure can produce sequences for N$_{STS}$=16 streams. In case of MU-MIMO, 16 streams may be used, so in that case all rows of matrix W may be in use. It should be understood that any subset of the W rows may be used to produce the sequences.

In one embodiment, a requirement may be to have the PAPR≤3.0 dB. Table 1 below provides a summary of PAPR properties of the designed sequence set in accordance with one or more embodiments of the optimized channel estimation system. The legacy DMG-CEF PAPR is equal to ~3.12 dB. Hence, the EDMG-CEF sequence set of the optimized channel estimation system has good PAPR properties. It is understood that the above descriptions are for purposes of illustration and are not meant to be limiting.

TABLE 1

| Stream # | W vector | PAPR, [dB] |
|---|---|---|
| 1 | [+1, -1, +j, -j] | 2.9775 |
| 2 | [-j, +1, -j, -j] | 2.9788 |
| 3 | [+1, -j, +1, -j] | 2.9800 |
| 4 | [-1, +1, -1, -j] | 2.9800 |
| 5 | [+1, +j, -1, -j] | 2.9838 |
| 6 | [-1, +j, +1, -j] | 2.9845 |
| 7 | [+j, -j, -j, -j] | 2.9886 |
| 8 | [+1, +1, +j, -j] | 2.9923 |
| 9 | [-1, -1, -j, -j] | 2.9923 |
| 10 | [-j, -j, -j, -j] | 2.9944 |
| 11 | [+j, +1, +j, -j] | 2.9944 |
| 12 | [-j, +1, +1, -j] | 2.9951 |
| 13 | [-1, +j, -j, -j] | 2.9966 |

TABLE 1-continued

| Stream # | W vector | PAPR, [dB] |
|---|---|---|
| 14 | [+j, -j, +1, -j] | 2.9975 |
| 15 | [-j, +1, -1, -j] | 2.9975 |
| 16 | [-j, -1, -j, -j] | 2.9992 |

Figure 5A:
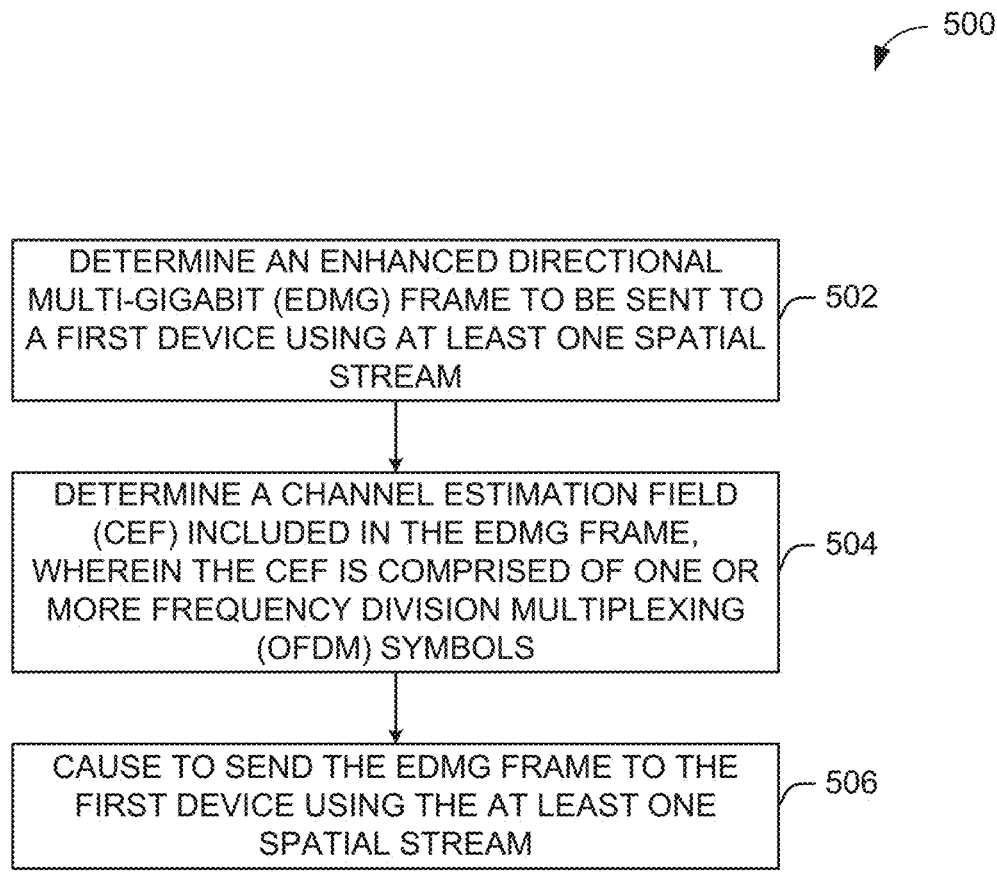
FIG. 5A depicts a flow diagram of an illustrative process associated with an optimized channel estimation field system, in accordance with one or more example embodiments of the present disclosure.

FIG. 5A illustrates a flow diagram of an illustrative process 500 for an illustrative optimized channel estimation field system, in accordance with one or more example embodiments of the present disclosure.

At block 502, a device (e.g., the user device(s) 120 and/or the AP 102 of FIG. 1) may determine an EDMG frame to be sent to another device (e.g., the user device(s) 120 and/or the AP 102 of FIG. 1) using at least one spatial stream. It should be understood that the reference to stream is a reference to a space-time stream that may carry information between a transmitting device and a receiving device based on antenna beamforming. Mutually orthogonal sequences for the channel estimation fields associated with the various streams may be generated by the device. In a legacy device, a single sequence is used, where cyclic shift diversity is applied to prevent coherent transmissions between different streams. In other words, legacy devices use only one sequence of pilots in the frequency domain and then that sequence is transferred to the time domain using IDFT. Consequently, in order to get different signals in the time domain for different streams, cyclic shift diversity is applied in the time domain. The device may define a set of sequences of pilots in the frequency domain such that the sequences in the set are different from each other within the frequency domain even before transferring the sequences to the time domain using IDFT. Consequently, when these sequences are transferred to the time domain using IDFT, different time domain sequences are generated without the need to utilize cyclic shift diversity to differentiate the different streams. This is because the sequences were different in the frequency domain even before applying the IDFT. In addition, the sequences may be selected in order to provide low PAPR after application of inverse discrete Fourier transform (IDFT) transformation in the time domain. For example, the PAPR should be less or equal to 3.0 dB.

At block 504, the device may determine a channel estimation field (CEF) included in the EDMG frame, wherein the CEF is comprised of one or more frequency division multiplexing (OFDM) symbols. The device may determine the CEF for SISO and/or for MIMO. For SISO, the CEF may be composed of two OFDM symbols. For MIMO, the general structure of the CEF may be composed of two OFDM symbols having a set of sequences such that different streams have different sequences. In the SISO and MIMO case, the first symbol may be related to the second symbol such that in one case the second symbol is the inverse of the first symbol and in another case, the second symbol is the exact copy of the first symbol.

At block 506, the device may cause to send the EDMG frame to the first device using the at least one spatial stream. The one or more spatial streams refer to one or more space-time streams that may carry information between a transmitting device and a receiving device based on antenna beamforming. For example, in the SISO case, there may be only one stream between a transmitting device and a receiving device. Consequently, the EDMG frame may be sent on that stream. In the MIMO case, there may be multiple streams between the transmitting device and the receiving device.

Figure 5B:
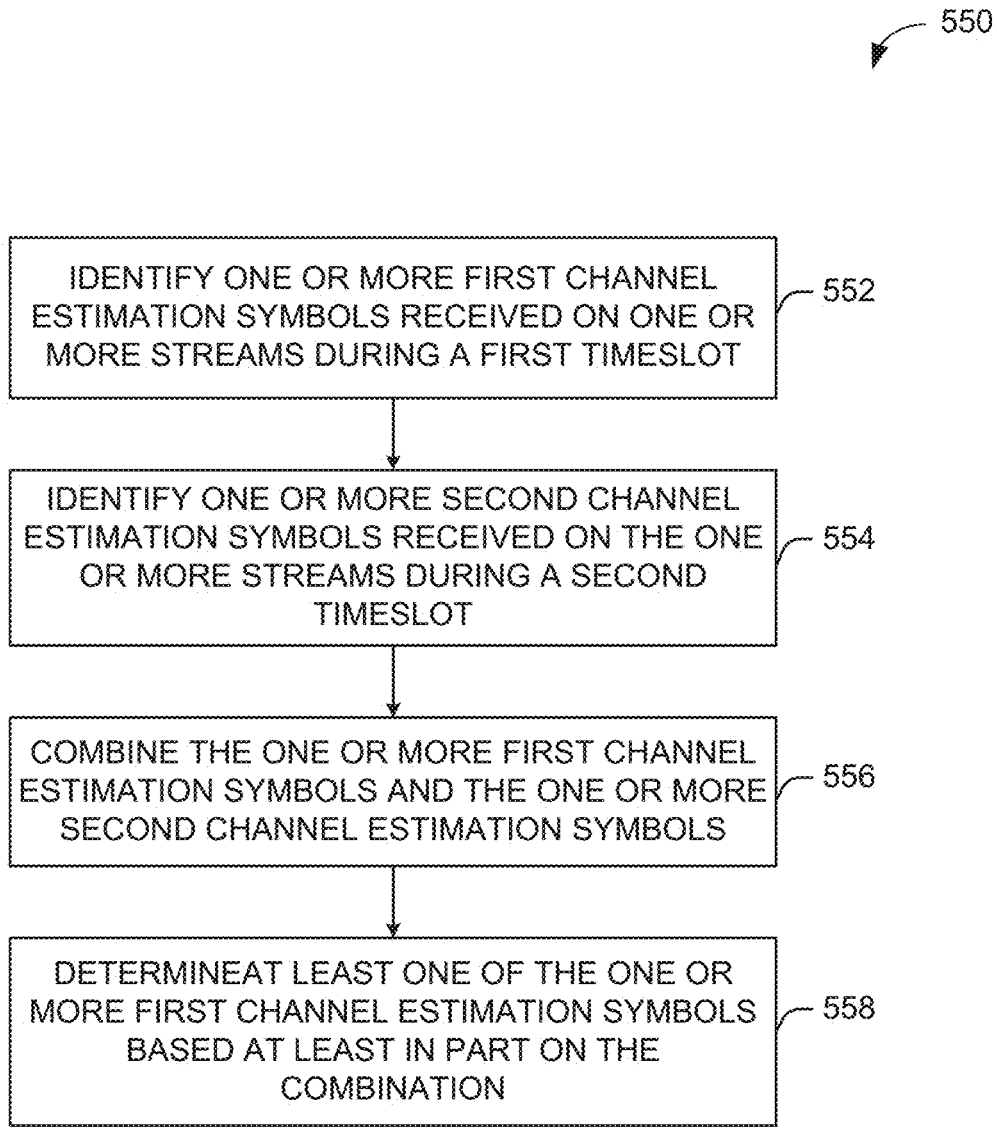
FIG. 5B depicts a flow diagram of an illustrative process associated with an optimized channel estimation field system, in accordance with one or more example embodiments of the present disclosure.

FIG. 5B illustrates a flow diagram of an illustrative process 550 for a high efficiency signal field coding system, in accordance with one or more example embodiments of the present disclosure.

At block 552, a device (e.g., the user device(s) 120 and/or the AP 102 of FIG. 1) may identify one or more first channel estimation symbols received on one or more streams during a first timeslot (e.g., T1). When the device receives the symbols, which are associated with the EDMG-CEF fields received from the transmitting device (e.g., AP 102), the device may be able to determine the channel estimation symbols based on how the structure was generated on the transmitting device. For MIMO, the structure may be generalized for any number of streams by selecting the size of the structure in accordance with an orthogonal P matrix to cover as many streams as possible.

At block 554, the device may identify one or more second channel estimation symbols received on the one or more streams during a second timeslot (e.g., T2). For example, if only one stream is used between the transmitting device and the receiving device, the symbols received during timeslots T1 and T2 may be enough for the receiving device to determine the channel estimation associated with that stream. This is similar to the SISO scenario described in FIGS. 3A and 3B, where in one case the second symbol (e.g., the symbol during T2) is the inverse of the first symbol (e.g., the symbol during T1). The receiving device may be able to determine, based on these two received symbols, what the channel estimation is.

At block 556, the device may combine the one or more first channel estimation symbols and the one or more second channel estimation symbols. For example, if at T1, the receiving device receives CE1 and at time T2, the receiving device receives a second symbol that is the exact copy of CE1, then it is able to determine the channel estimation based on the sum of the two symbols at the two timeslots (e.g., 2CE1). In case the two symbols were the inverse of each other, then subtracting from each other results in 2CE1. In case two streams are established between the transmitting device and the receiving device, the channel estimation symbols received during timeslots T1 and T2, where T2 is subsequent to T1 in the time domain, may be needed in order to determine the channel estimation for stream one and stream two. For example, having two streams, the receiving device may receive CE1+CE2 during T1. During T2, the receiving device may receive −CE1+CE2 as shown in FIG. 4B. In order to extract CE2, the received sum (e.g., CE1+CE2) during T1 is added to the received difference (e.g., −CE1+CE2) during T2. That is, [CE1+CE2]−[−CE1+CE2] =2CE2. Therefore, the channel estimation of the second stream is determined, and the receiving device is able to utilize the channel estimation for the second stream when receiving other frames on that stream. In a similar manner, in order to extract CE1, the received sum during T1 is subtracted from the received sum during T2. That is, [CE1+CE2]−[−CE1+CE2]=2CE1. Therefore, the channel estimation of the first stream is determined, and the receiving device is able to utilize the channel estimation for the first stream when receiving other frames on that stream. A similar mechanism may be applied based on the number of streams needed. This mechanism will ensure that the receiver is able to separate the streams.

At block 558, the device may determine at least one of the one or more first channel estimation symbols based at least in part on the combination. Based on the above calculations, the receiving device may be able to determine the two symbols associated with the channel estimation field (CEF) to ensure that the receiver is able to separate the streams using the channel estimations on a stream basis. It is understood that the above descriptions are for purposes of illustration and are not meant to be limiting.

Figure 6:
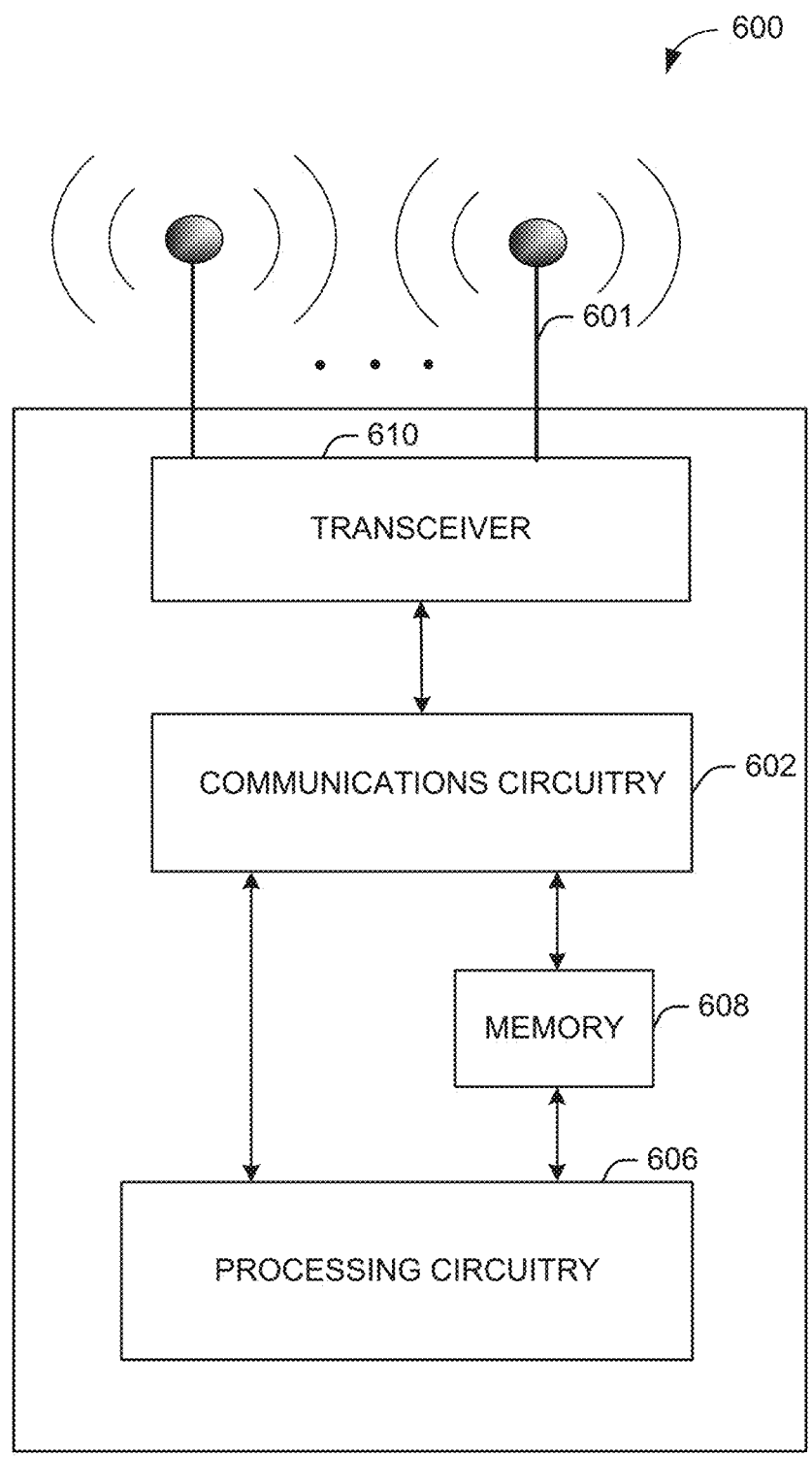
FIG. 6 depicts a functional diagram of an example communication station that may be suitable for use as a user device, in accordance with one or more example embodiments of the present disclosure.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or media access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 1-5.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

Figure 7:
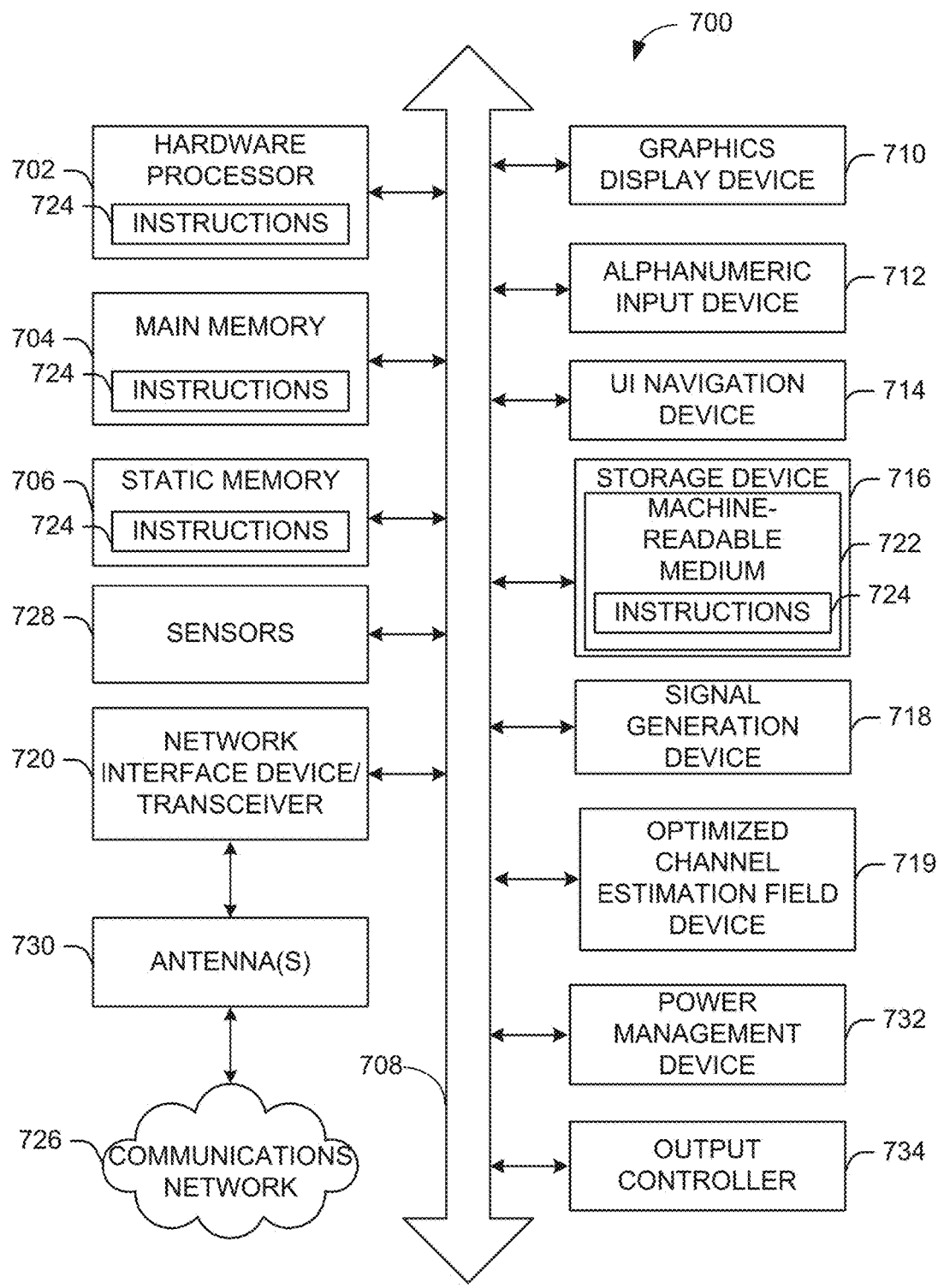
FIG. 7 depicts a block diagram of an example machine upon which any of one or more techniques (e.g., methods) may be performed, in accordance with one or more example embodiments of the present disclosure.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a OFDMA uplink resource allocation device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The optimized channel estimation field device 719 may carry out or perform any of the operations and processes (e.g., the processes 500 and 550) described and shown above. For example, the optimized channel estimation field device 719 may facilitate a design of a channel estimation field (CEF) for EDMG OFDM for the physical layer (PHY).

The optimized channel estimation field device 719 may cover SISO and MIMO single channel transmission.

In one embodiment, the optimized channel estimation field device 719 may determine the EDMG CEF to be comprised of two OFDM symbols. In one option, the second symbol may have an inverted sign polarity compared to the first symbol. In another option, the second OFDM symbol may represent an exact copy of the first OFDM symbol.

The optimized channel estimation field device 719 may define pilot sequences in the frequency domain, rather than the time domain Golay sequences defined in the IEEE 802.11ad standard.

The optimized channel estimation field device 719 may facilitate a mutually orthogonal sequence set, instead of using cyclic shift diversity (CSD) as was done in legacy devices (e.g., IEEE 802.11n/ac). The orthogonality property of the sequences prevents the coherent signal transmission of different space-time streams in the case of MIMO and avoids unintentional beamforming.

It is understood that the above are only a subset of what the optimized channel estimation field device 719 may be configured to perform and that other functions included throughout this disclosure may also be performed by the optimized channel estimation field device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes (e.g., processes 500 and 550) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include memory and processing circuitry configured to determine an enhanced directional multi-gigabit (EDMG) frame to be sent to a first device using at least one spatial stream. The memory and processing circuitry may be further configured to determine a channel estimation field (CEF) to be included in the EDMG frame, wherein the CEF is comprised of one or more frequency division multiplexing (OFDM) symbols. The memory and processing circuitry may be further configured to cause to send the EDMG frame to the first device using the at least one spatial stream.

The implementations may include one or more of the following features. The one or more OFDM symbols include at least in part a first symbol and a second symbol, wherein the second symbol that has an inverted polarity sign to the first symbol. The one or more OFDM symbols include at least in part a first symbol and a second symbol, wherein the second symbol is the same as the first symbol. The one or more spatial streams are associated with a single-input single-output (SISO) or a multiple-input multiple-output (MIMO) single channel transmission. The first symbol is comprised of one or more pilot sequences, wherein the one or more pilot sequences are defined in a frequency domain. The memory and the processing circuitry are further configured to determine the first symbol to be comprised of at least in part a first sequence having an initial first sequence, and a second sequence having an initial second sequence, wherein the first sequence and the second sequence are determined by performing one or more iterations. The memory and the processing circuitry are further configured to determine a first iteration of the first sequence by multiplying the initial first sequence by a weight vector and adding that to the initial second sequence. The memory and processing circuitry may be further configured to determine a first iteration of the second sequence by multiplying the initial first sequence by the weight vector and adding that to negative values of the initial second sequence. The memory and processing circuitry may be further configured to perform additional iterations to a maximum value of iterations. Performing one or more iterations comprises determining the first sequence by $A_n^{(k)} = \{W(n, k)*A_n^{(k-1)}, B_n^{(k-1)}\}$, wherein $A^{(0)} = \{+1, +j, +j, -1, -j, +j, -1, +1, -1, +j, +1\}$; and determining the second sequence by $B_n^{(k)} = \{W(n, k)*A_n^{(k-1)}, -B_n^{(k-1)}\}$; wherein $B^{(0)} = \{-1, +1, -1, +j, +1, +1, -j, -j, -j, +1, +1\}$, and wherein k is an iteration index, and W(n, k) is a weight vector for the $n^{th}$ stream and the $k^{th}$ iteration. The weight vector W is based on a weight matrix, wherein the weight matrix has one or more rows and one or more columns, wherein the one or more rows are associated with a stream number, and the one or more columns are associated with a number of iteration of the one or more iterations, and wherein the weight matrix is defined as $$\{+1, -1, +j, -j;\\ -j, +1, -j, -j;\\ +1, -j, +1, -j;\\ -1, +1, -1, -j;\\ +1, +j, -1, -j;$$

-continued

−1, +j, +1, −j;

+j, −j, −j, −j;

1, +1, +j, −j;

−1, −1, −j, −j;

−j, −j, −j, −j;

+j, +1, +j, −j;

−j, +1, +1, −j;

−1, +j, −j, −j;

+j, −j, +1, −j;

−j, +1, −1, −j;

−j, −1, −j, −j}.

The device may further include a transceiver configured to transmit and receive wireless signals. The device may further include one or more antennas coupled to the transceiver.

According to example embodiments of the disclosure, there may be a non-transitory computer-readable medium storing computer-executable instructions which, when executed by a processor, cause the processor to perform operations. The operations may include identifying one or more first channel estimation symbols received on one or more streams during a first timeslot. The operations may include identifying one or more second channel estimation symbols received on the one or more streams during a second timeslot. The operations may include combining the one or more first channel estimation symbols and the one or more second channel estimation symbols. The operations may include determining at least one of the one or more first channel estimation symbols based at least in part on the combination.

The implementations may include one or more of the following features. The operations further comprise determining a channel estimation field (CEF) comprised of two orthogonal frequency division multiplexing (OFDM) symbols. The operations further comprise identifying a first sequence Associated with a first symbol of the one or more first channel estimation symbols. The operations may include identifying a second sequence Associated with a second symbol of the one or more first channel estimation symbols. The first sequence is different from the second sequence in a frequency domain. The second symbol has an inverted polarity sign to the first symbol. The second symbol is the same as the first symbol.

According to example embodiments of the disclosure, there may include a method. The method may include determining, by one or more processors, an enhanced directional multi-gigabit (EDMG) frame to be sent to a first device using at least one spatial stream. The method may include determining a channel estimation field (CEF) to be included in the EDMG frame, wherein the CEF is comprised of one or more frequency division multiplexing (OFDM) symbols. The method may include causing to send the EDMG frame to the first device using the at least one spatial stream.

The implementations may include one or more of the following features. The one or more OFDM symbols include at least in part a first symbol and a second symbol, wherein the second symbol that has an inverted polarity sign to the first symbol. The one or more OFDM symbols include at least in part a first symbol and a second symbol, wherein the second symbol is a copy of the first symbol. The one or more spatial streams are associated with a single-input single-output (SISO) or a multiple-input multiple-output (MIMO) single channel transmission. The first symbol is comprised of one or more pilot sequences, wherein the one or more pilot sequences are defined in a frequency domain. The method may further include determining the first symbol to be comprised of at least in part a first sequence having an initial first sequence, and a second sequence having an initial second sequence, wherein the first sequence and the second sequence are determined by performing one or more iterations. The method may further include determining a first iteration of the first sequence by multiplying the initial first sequence by a weight vector and adding that to the initial second sequence. The method may include determining a first iteration of the second sequence by multiplying the initial first sequence by the weight vector and adding that to negative values of the initial second sequence. The method may include performing additional iterations to a maximum value of iterations. Performing one or more iterations may include determining the first sequence by $A_n^{(k)} = \{W(n, k) * A_n^{(k-1)}, B_n^{(k-1)}\}$, wherein $A^{(0)} = \{+1, +j, +j, -1, -j, +j, -1, +1, -1, +j, +1\}$; and determining the second sequence by $B_n^{(k)} = \{W(n, k) * A_n^{(k-1)}; -B_n^{(k-1)}\}$; wherein $B^{(0)} = \{-1, +1, -1, +j, +1, +1, -j, -j, +1, +1\}$, and wherein k is an iteration index, and $W(n, k)$ is a weight vector for the $n^{th}$ stream and the $k^{th}$ iteration. The weight vector W is based on a weight matrix, wherein the weight matrix has one or more rows and one or more columns, wherein the one or more rows are associated with a stream number, and the one or more columns are associated with a number of iteration of the one or more iterations, and wherein the weight matrix is defined as {+1, −1, +j, −j;

−j, +1, −j, −j;

+1, −j, +1, −j;

−1, +1, −1, −j;

+1, +j, −1, −j;

−1, +j, +1, −j;

+j, −j, −j, −j;

1, +1, +j, −j;

−1, −1, −j, −j;

−j, −j, −j, −j;

+j, +1, +j, −j;

−j, +1, +1, −j;

−1, +j, −j, −j;

+j, −j, +1, −j;

−j, +1, −1, −j;

−j, −1, −j, −j}.

In example embodiments of the disclosure, there may be an apparatus. The apparatus may include means for determining, by one or more processors, an enhanced directional multi-gigabit (EDMG) frame to be sent to a first device using at least one spatial stream. The apparatus may include means for determining a channel estimation field (CEF) to be included in the EDMG frame, wherein the CEF is comprised of one or more frequency division multiplexing (OFDM) symbols. The apparatus may include means for causing to send the EDMG frame to the first device using the at least one spatial stream.

The implementations may include one or more of the following features. The one or more OFDM symbols include at least in part a first symbol and a second symbol, wherein the second symbol that has an inverted polarity sign to the first symbol. The one or more OFDM symbols include at least in part a first symbol and a second symbol, wherein the second symbol is a copy of the first symbol. The one or more spatial streams are associated with a single-input single-output (SISO) or a multiple-input multiple-output (MIMO) single channel transmission. The first symbol is comprised of one or more pilot sequences, wherein the one or more pilot sequences are defined in a frequency domain. The apparatus may further include means for determining the first symbol to be comprised of at least in part a first sequence having an initial first sequence, and a second sequence having an initial second sequence, wherein the first sequence and the second sequence are determined by performing one or more iterations. The apparatus may further include means for determining a first iteration of the first sequence by multiplying the initial first sequence by a weight vector and adding that to the initial second sequence. The apparatus may further include means for determining a first iteration of the second sequence by multiplying the initial first sequence by the weight vector and adding that to negative values of the initial second sequence. The apparatus may further include means for performing additional iterations to a maximum value of iterations. The apparatus may further include means for determining the first sequence by $A_n^{(k)}=\{W(n, k)*A_n^{(k-1)}, B_n^{(k-1)}\}$, wherein $A^{(0)}=\{+1, +j, +j, -1, -j, +j, -1, +1, -1, +j, +1\}$; and means for determining the second sequence by $B_n^{(k)}=\{W(n, k)*A_n^{(k-1)}, -B_n^{(k-1)}\}$; wherein $B^{(0)}=\{-1, +1, -1, +j, +1, +1, -j, -j, -j, +1, +1\}$, and wherein k is an iteration index, and W(n, k) is a weight vector for the $n^{th}$ stream and the $k^{th}$ iteration. The weight vector W is based on a weight matrix, wherein the weight matrix has one or more rows and one or more columns, wherein the one or more rows are associated with a stream number, and the one or more columns are associated with a number of iteration of the one or more iterations, and wherein the weight matrix is defined as $$\{+1, -1, +j, -j;$$
$$-j, +1, -j, -j;$$
$$+1, -j, +1, -j;$$
$$-1, +1, -1, -j;$$
$$+1, +j, -1, -j;$$
$$-1, +j, +1, -j;$$
$$+j, -j, -j, -j;$$
$$1, +1, +j, -j;$$
$$-1, -1, -j, -j;$$
$$-j, -j, -j, -j;$$
$$+j, +1, +j, -j;$$
$$-j, +1, +1, -j;$$
$$-1, +j, -j, -j;$$
$$+j, -j, +1, -j;$$
$$-j, +1, -1, -j;$$
$$-j, -1, -j, -j\}.$$

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device comprising:
   at least one memory that stores computer-executable instructions; and
   at least one processor configured to access the at least one memory, wherein the at least one processor is configured to execute the computer-executable instructions to:
   determine a first sequence having an initial first sequence;
   determine a second sequence having an initial second sequence;
   perform one or more iterations of the first sequence and the second sequence, wherein a first iteration of the one or more iterations of the first sequence and the second sequence comprises multiplying the initial first sequence by a vector and adding that to the initial second sequence;
   determine a first orthogonal frequency-division multiplexing (OFDM) symbol comprising the first sequence and the second sequence based on the one or more iterations;
   determine an enhanced directional multi-gigabit (EDMG) frame to be sent to a first device using at least one spatial stream;
   determine a channel estimation field (CEF) to be included in the EDMG frame, wherein the CEF comprises the first symbol; and
   cause to send the EDMG frame to the first device using the at least one spatial stream.

2. The device of claim 1, wherein the one or more OFDM symbols include at least in part a first symbol and a second symbol, wherein the second symbol that has an inverted polarity sign to the first symbol.

3. The device of claim 1, wherein the one or more OFDM symbols include at least in part a first symbol and a second symbol, wherein the second symbol is the same as the first symbol.

4. The device of claim 1, wherein the one or more spatial streams are associated with a single-input single-output (SISO) or a multiple-input multiple-output (MIMO) single channel transmission.

5. The device of claim 3, wherein the first symbol is comprised of one or more pilot sequences, wherein the one or more pilot sequences are defined in a frequency domain.

6. The device of claim 2, wherein the memory and the processing circuitry are further configured to determine the first symbol to be comprised of at least in part a first sequence having an initial first sequence, and a second sequence having an initial second sequence, wherein the first sequence and the second sequence are determined by performing one or more iterations.

7. The device of claim 6, wherein performing one or more iterations comprises:
   determining the first sequence by $A_n^{(k)}=\{W(n, k)*A_n^{(k-1)}, B_n^{(k-1)}\}$, wherein $A^{(0)}=\{+1, +j, +j, -1, -j, +j, -1, +1, -1, +j, +1\}$; and
   determining the second sequence by $B_n^{(k)}=\{W(n, k)*A_n^{(k-1)}, -B_n^{(k-1)}\}$; wherein $B^{(0)}=\{-1, +1, -1, +j, +1, +1, -j, -j, -j, +1, +1\}$, and wherein k is an iteration index, and $W(n, k)$ is a vector for the $n^{th}$ stream and the $k^{th}$ iteration.

8. The device of claim 7, wherein the vector W is based on a weight matrix, wherein the weight matrix has one or more rows and one or more columns, wherein the one or more rows are associated with a stream number, and the one or more columns are associated with a number of iteration of the one or more iterations, and wherein the weight matrix is defined as $$\begin{aligned}
&\{+1, -1, +j, -j;\\
&-j, +1, -j, -j;\\
&+1, -j, +1, -j;\\
&-1, +1, -1, -j;\\
&+1, +j, -1, -j;\\
&-1, +j, +1, -j;\\
&+j, -j, -j, -j;\\
&1, +1, +j, -j;\\
&-1, -1, -j, -j;\\
&-j, -j, -j, -j;\\
&+j, +1, +j, -j;\\
&-j, +1, +1, -j;\\
&-1, +j, -j, -j;\\
&+j, -j, +1, -j;\\
&-j, +1, -1, -j;\\
&-j, -1, -j, -j\}.
\end{aligned}$$

9. The device of claim 1, further comprising a transceiver configured to transmit and receive wireless signals.

10. The device of claim 9, further comprising one or more antennas coupled to the transceiver.

11. A non-transitory computer-readable medium storing computer-executable instructions which when executed by one or more processors result in performing operations comprising:
   identifying one or more first channel estimation symbols received on one or more streams during a first timeslot, wherein the one or more first channel estimation symbols are based on one or more iterations of a first sequence and a second sequence included in at least one of the one or more first channel estimation symbols, wherein a first iteration of the one or more iterations of the first sequence and the second sequence comprises multiplying an initial first sequence by a vector and adding that to an initial second sequence;
   identifying one or more second channel estimation symbols received on the one or more streams during a second timeslot, wherein the one or more second channel estimation symbols are based on one or more iterations of a third sequence and a fourth sequence included in at least one of the one or more second channel estimation symbols;
combining the one or more first channel estimation symbols and the one or more second channel estimation symbols; and
decode the combined one or more first channel estimation symbols and the one or more second channel estimation symbols.

12. The non-transitory computer-readable medium of claim 11, wherein the operations further comprise determining a channel estimation field (CEF) comprised of two orthogonal frequency division multiplexing (OFDM) symbols.

13. The non-transitory computer-readable medium of claim 11, wherein the operations further comprise:
identifying a first sequence Associated with a first symbol of the one or more first channel estimation symbols; and
identifying a second sequence Associated with a second symbol of the one or more first channel estimation symbols.

14. The non-transitory computer-readable medium of claim 13, wherein the first sequence is different from the second sequence in a frequency domain.

15. The non-transitory computer-readable medium of claim 13, wherein the second symbol has an inverted polarity sign to the first symbol.

16. The non-transitory computer-readable medium of claim 13, wherein the second symbol is the same as the first symbol.

17. A method comprising:
determining, by one or more processors, a first sequence having an initial first sequence;
determining a second sequence having an initial second sequence;
performing one or more iterations of the first sequence and the second sequence, wherein a first iteration of the one or more iterations of the first sequence and the second sequence comprises multiplying the initial first sequence by a vector and adding that to the initial second sequence;
determining a first orthogonal frequency-division multiplexing (OFDM) symbol comprising the first sequence and the second sequence based on the one or more iterations;
determining an enhanced directional multi-gigabit (EDMG) frame to be sent to a first device using at least one spatial stream;
determining a channel estimation field (CEF) to be included in the EDMG frame, wherein the CEF comprises the first symbol; and
causing to send the EDMG frame to the first device using the at least one spatial stream.

18. The method of claim 17, wherein the one or more OFDM symbols include at least in part a first symbol and a second symbol, wherein the second symbol that has an inverted polarity sign to the first symbol.

19. The method of claim 17, wherein the one or more OFDM symbols include at least in part a first symbol and a second symbol, wherein the second symbol is a copy of the first symbol.

* * * * *